United States Patent [19]
Scheef, Jr.

[11] Patent Number: 5,794,959
[45] Date of Patent: Aug. 18, 1998

[54] TRAILER HITCH ASSEMBLY, AND DUAL PURPOSE TRAILER UTILIZING SUCH HITCH ASSEMBLY

[76] Inventor: Carl John Scheef, Jr., 950 Jeter Rd., Argyle, Tex. 76226

[21] Appl. No.: 454,751

[22] Filed: May 31, 1995

[51] Int. Cl.⁶ .................................................. B60D 1/24
[52] U.S. Cl. .................... 280/400; 280/402; 280/789; 224/924; 224/521; 224/534; 224/537; 414/426; 414/462
[58] Field of Search .................... 280/400, 402, 280/405.1, 415.1, 476.1, 492–495, 504, 511, 789; 224/924, 519, 520, 521, 534, 537; 414/426, 462, 537, 563

[56] References Cited

U.S. PATENT DOCUMENTS

| | | | |
|---|---|---|---|
| 2,471,051 | 5/1949 | Tway | 414/426 |
| 3,428,332 | 2/1969 | McCance | 280/202 |
| 3,625,545 | 12/1971 | Somers et al. | 280/400 |
| 3,757,975 | 9/1973 | Sneider | 414/462 |
| 3,997,186 | 12/1976 | Pottorff | 280/402 |
| 4,032,167 | 6/1977 | Chereda | 414/537 X |
| 4,243,243 | 1/1981 | Edmisten | 280/446 B |
| 4,488,735 | 12/1984 | Hehr | 280/656 |
| 4,504,075 | 3/1985 | Dawson | 280/402 |
| 4,588,199 | 5/1986 | Fisher | 280/494 X |
| 4,763,914 | 8/1988 | Lemmons | 280/401 |
| 5,228,712 | 7/1993 | Speier | 280/401 |
| 5,326,215 | 7/1994 | Eberhardt | 414/563 |
| 5,456,564 | 10/1995 | Bianchini | 224/521 X |

FOREIGN PATENT DOCUMENTS

| | | | |
|---|---|---|---|
| 3526-243 | 2/1987 | Germany | 224/924 |
| 2 074 523 | 11/1981 | United Kingdom | 280/402 |

Primary Examiner—Brian L. Johnson
Assistant Examiner—Victor E. Johnson
Attorney, Agent, or Firm—Gilbreth & Strozier, P.C.; J. M. (Mark) Gilbreth; Robert W. Strozier

[57] ABSTRACT

A trailer hitch assembly for use in hauling a motorcyle behind a motorcyle which includes a wheel cradle for positioning the front wheel of the motorcyle in front of the hitch. Such arrangement allows for the use of a lighter weight trailer and provides for greater stability as the front wheel is held in-plane with the vehicle during travel.

9 Claims, 6 Drawing Sheets

TRAILER HITCH ASSEMBLY, AND DUAL PURPOSE TRAILER UTILIZING SUCH HITCH ASSEMBLY

BACKGROUND OF THE INVENTION

1. Field of the Invention

The present invention relates to trailer hitches, and to trailers utilizing such hitches. In another aspect, the present invention relates to trailer hitch assemblies for use in hauling motorcycles and other small vehicles, and to trailer hitches utilizing such hitch assemblies. In even another aspect, the present invention relates to a trailer hitch assembly for hauling motorcycles and other small vehicles which positions one of the motorcycle wheels over or in front of the hitch connection and thus transfers a portion of the weight of the motorcycle to the hitch. In still another aspect, the present invention relates to a trailer hitch assembly for hauling motorcycles and other small vehicles which during turning operations keeps the front wheel of the motorcycle parallel with the rear wheels of the towing vehicle to provide improved stability during turning.

2. Description of the Related Art

It is not always desirable or feasible to ride a motorcycle to a final destination. A great and increasing number of persons do not and will not ride their motorcycle on a street or highway and subject themselves to the hazards and dangers associated therewith. Instead, they transport their motorcycles to the location where they intend to ride them, and there, mount their cycles and ride them. Various ways of transporting a motorcycle are available, and generally include transporting the motorcycle on another vehicle or on a trailer hauled behind another vehicle.

In carrying out such a practice, the person enjoys the safety, comfort and often the greater speed of travelling in a automobile or truck while travelling to and from the location or area where he rides his motorcycle. The above noted practice has lead to the use of trailers for transporting motorcycles or other small vehicles. The trailers are adapted to be coupled with and towed behind a vehicle.

Numerous types of trailers for transporting a motorcycle exist in the prior art. However, these trailers suffer from one or more limitations.

For example, trailers which are generally designed to support the weight of the motorcycle are generally too heavy to serve the dual purpose of being suitable for towing behind the motorcycle, should that be desired. Additionally, gas milage of the hauling vehicle will be negatively impacted by the weight of the trailer.

As an other example, during a turning operation, both wheels of the motor cycle tend to be out-of-plane with the towing vehicle. That is because, as the vehicle turns the relative position of the vehicle and the trailer change, and the motorcycle is generally positioned to move with the trailer. In such an arrangement, the upright motorcycle must be extensively secured to the trailer to prevent tipping. Also, where the center of gravity of the motorcycle is positioned causes stability problems during hauling.

The prior art is replete with many examples of trailers for hauling motorcycles. However, the prior art trailers are all designed such that both wheels of the transported motorcycle are positioned behind the trailer hitch or connection, thus requiring that the trailer support a substantial portion of the motorcycle weight. Such design requires a heavier trailer, which as explained above is a detriment. Also, where the center of gravity of the motorcycle is positioned in the prior art trailers causes stability problems when hauling the motorcycle.

U.S. Pat. No. 3,625,545, issued Dec. 7, 1971 to Somers discloses a trailer adapted to be releasably coupled with and towed by a draft vehicle and which is adapted to support and carry one or more motorcycles. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

U.S. Pat. No. 3,997,186, issued Dec. 14, 1976 to Pottorff discloses a motorcycle towing device of the fifth wheel type. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

U.S. Pat. No. 4,243,243, issued Jan. 6, 1981 to Edmisten discloses a hitch arrangement for use between a towing vehicle and a trailer, which is used to stabilize a generally upright load such as a motorcycle against tilting as the vehicle and trailer move through a turn. The hitch includes an inextensible elongate pliable element and tie down members connecting the element and the load. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

U.S. Pat. No. 4,488,735, issued Dec. 18, 1984 to Hehr discloses a collapsible lightweight trailer. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

U.S. Pat. No. 4,763,914, issued Aug. 16, 1988 to Lemmons discloses a folding motorcycle transport trailer. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

U.S. Pat. No. 5,228,712, issued Jul. 20, 1993 to Speier discloses a collapsible motorcycle ramp trailer which is provided with an adjustable axle for balancing the weight of a vehicle-towed motorcycle for optimum transport. The trailer disclosed in this patent positions both wheels of the motorcycle behind the hitch, thus requiring that the trailer be heavy and sturdy enough to support a substantial portion of the motorcycle weight. Such a trailer is not suitable for hauling behind a motorcycle. Additionally, during a turning operation, both wheels of the hauled motorcycle will be out-of-plane with the towing vehicle, which as explained above, contributes to stability problems.

The above trailers all utilize designs which position both wheels of the hauled motorcycle behind the trailer hitch or connection, which as explained above requires a heavier trailer, which is not suitable for hauling behind the motorcycle.

Additionally, the above trailers all utilize designs which during a turning operation, both of the wheels of the motorcycle will be out-of-plane with the towing vehicle, thus contributing to stability problems.

Thus, there is one need in the art for an improved trailer not suffering from the limitations of the prior art.

There is another need in the art for a trailer that is suitable for both hauling a motorcycle, and for being hauled behind the same motorcycle.

There is even another need in the art for a trailer that does not suffer from the stability problems of prior art trailers.

These and other needs in the art will become apparent to those of skill in the art upon review of this patent specification, including its drawings and claims.

SUMMARY OF THE INVENTION

It is one object of the present invention to provide for an improved trailer not suffering from the limitations of the prior art.

It is another object of the present invention to provide for a trailer that is suitable for both hauling a motorcycle, and for being hauled behind the same motorcycle.

It is even another object of the present invention to provide for a trailer that does not suffer from the stability problems of prior art trailers.

These and other objects of the present invention will become apparent to those of skill in the art upon review of this patent specification, including its drawings and claims.

According to one embodiment of the present invention there is provided a trailer for hauling any vehicle, for example a motorcycle, a three-wheeler or a golf cart. The trailer includes a bed which has wheels and a tongue affixed to the bed. The tongue will lockably engage with the hitch of a towing vehicle. The embodiment includes a wheel cradle assembly that is positioned adjacent to the tongue and is adapted to receive a wheel of the vehicle being hauled. The wheel cradle assembly is further adapted to position at least a portion of the wheel of wheeled vehicle between the hitch and the towing vehicle.

According to another embodiment of the present invention there is provided a trailer hitch assembly for use with a trailer for hauling a vehicle. The hitch assembly includes a hitch which is adapted to be affixed to a towing vehicle, and is also adapted to receive a tongue of the trailer. The hitch assembly also includes a wheel cradle assembly which is located adjacent to the hitch and is adapted to receive a wheel of a vehicle that is being hauled. The wheel cradle assembly is further adapted to position at least a portion of the wheel of wheeled vehicle between the hitch and the towing vehicle.

BRIEF DESCRIPTION OF THE DRAWINGS

For the following FIGS., like numbers in different drawings refer to like members.

DETAILED DESCRIPTION OF THE INVENTION

Figure 1:
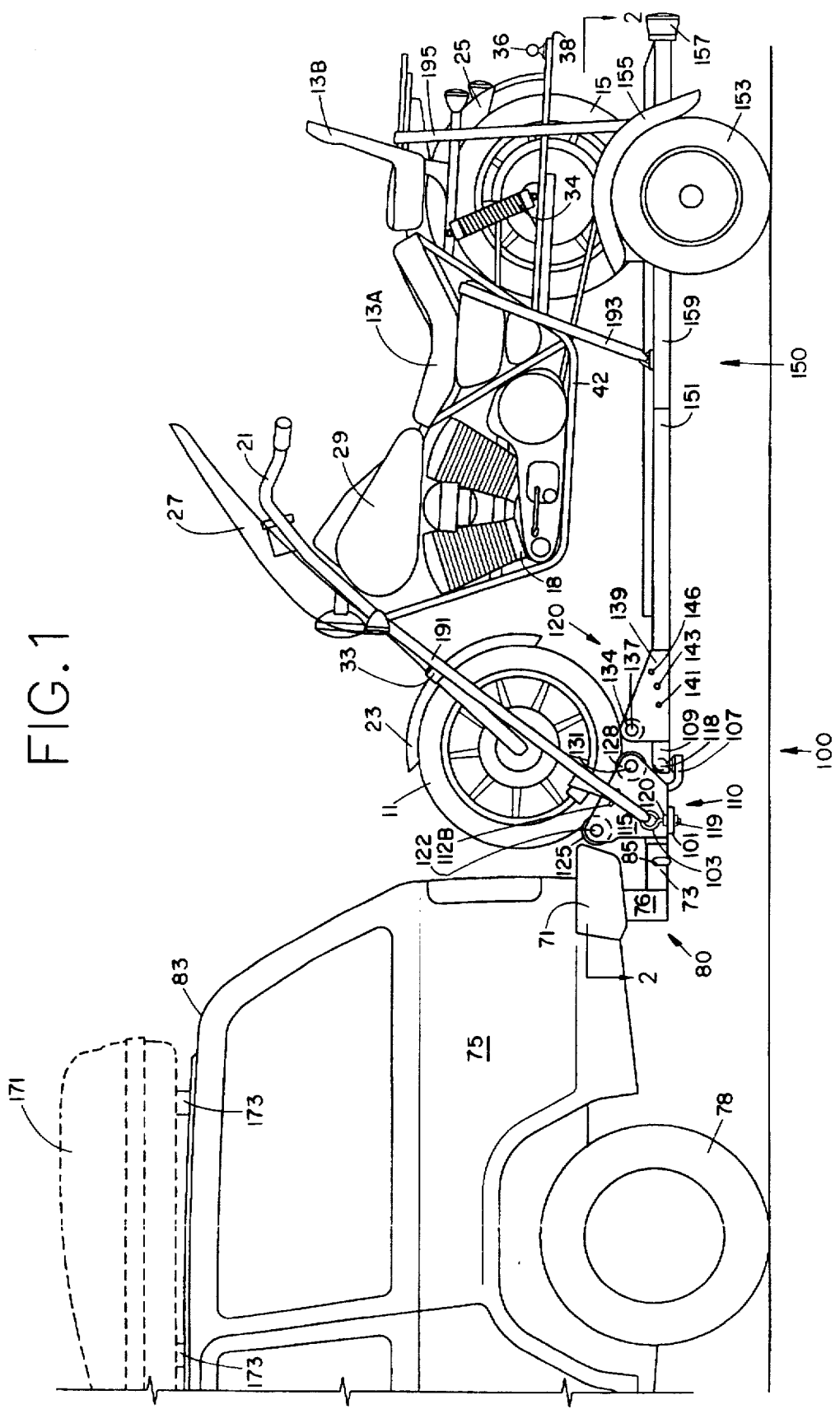
FIG. 1 is an illustration showing motorcycle 10 being hauled on trailer 150 which is attached to vehicle 70 via the present invention hitch apparatus 100.

The present invention will first be described by reference to FIG. 1, which is an illustration showing motorcycle 10 being hauled on trailer 150 which is attached to vehicle 70 via the hitch assembly 100.

Vehicle 70 may be any type of vehicle that is suitable for hauling motorcycle trailer 150. In the embodiment shown, vehicle 70 includes chassis 75, bumper 80, cargo container 171. Bumper 80 generally includes upper portion 71, lower portion 76, and receiving arm 73 attached to lower portion 76. The cargo container 171 is generally attached to roof 83 of chassis 75 by one or more attachment members 173.

Motorcycle 10 is a typical motorcycle and in the embodiment shown includes framing 42, front wheel 11, rear wheel 15, motor 18, and front and rear fenders 23 and 25. Motorcycle 10 further includes front and back seats 13A and 13B, tank 29, handlebars 21, windshield 27, and front and rear shocks 33 and 34. Motorcycle 10 even further includes trailer hitch 36, which is connected to framing 42 via support bar 38.

Trailer 150 generally includes front bed portion 151, rear bed portion 159, tongue 109, wheels 153, fender 155, and lights 157. In the embodiment shown, front bed portion 151 can be adapted to support an ice chest, tool chest or other storage container; such an ice chest, tool chest or storage container could be built into front bed portion 151, be provided a recess into which it is positioned, or could be secured to front bed portion 151 in any suitable manner such as with straps. Further, optional ramp 162 is pictured in the embodiment shown and can be used to load and unload motorcycle 10.

Hitch assembly 100 generally includes a front cradle member 110 and a rear cradle member 120, which serve to position a portion of front wheel 11 at least over hitch 118, or preferably in front of hitch 118 between hitch 118 and vehicle 70. This is because, in the practice of the present invention it is desirable to shift as much of the weight of motorcycle 10 forward to vehicle 70 as possible. This is generally accomplished by moving at least a portion of the weight of motorcycle 10 over or in front of hitch 118. In the embodiment shown, hitch 118 is a traditional common commercially available ball hitch. For many applications, a Class III-type hitch for use for tongue weights of about 300 to about 500 pounds, will be suitable.

Positioning at least a portion of wheel 11 over hitch 118 will serve to shift some of the weight of motorcycle 10 forward toward vehicle 70. Preferably, at least a portion of wheel 11 is positioned in front of hitch 118, that is, between hitch 118 and vehicle 70. Of course, it should be understood that "between" hitch 118 and vehicle 70 does not necessarily require that the wheel be positioned on a line between hitch 118 and vehicle 70. Rather, "between" hitch 118 and vehicle 70 merely requires that a portion of wheel 11 be positioned in front of hitch 118 and behind vehicle 70. Thus, in the embodiment shown, front portion 11A of wheel 11 is considered to be between hitch 118 and vehicle 70, that is, in front of hitch 118 and behind vehicle 70.

Generally in the practice of the present invention, it is important that a portion of the weight of motorcycle 10 be shifted forward toward hitch 118 and be supported by hitch 118 and thus supported ultimately by vehicle 70. Such a shifting will relieve load weight of the trailer 10 and allow trailer 10 to be made of lighter material. Preferably, in the practice of the present invention at least 25% of the weight of motorcycle 10 will be shifted forward toward hitch 118 and supported by hitch 118. More preferably, in the practice of the present invention at least 35% of the weight of motorcycle 10 will be shifted forward toward hitch 118 and supported by hitch 118. Even more preferably, in the practice of the present invention at least 40% of the weight of motorcycle 10 will be shifted forward toward hitch 118 and supported by hitch 118 and most preferably, in the practice of the present invention at least 50% of the weight of motorcycle 10 will be shifted forward toward hitch 118 and supported by hitch 118.

It is to be understood in the practice of the present invention, that either wheel 11 or 15 of motorcycle 10 could be positioned over hitch 118. It is also to be understood that the present invention could be utilized to haul almost any type of vehicle, including various types of three and four wheel all terrain vehicles, i.e., "three wheelers", "four wheelers", and golf carts.

Figure 2:
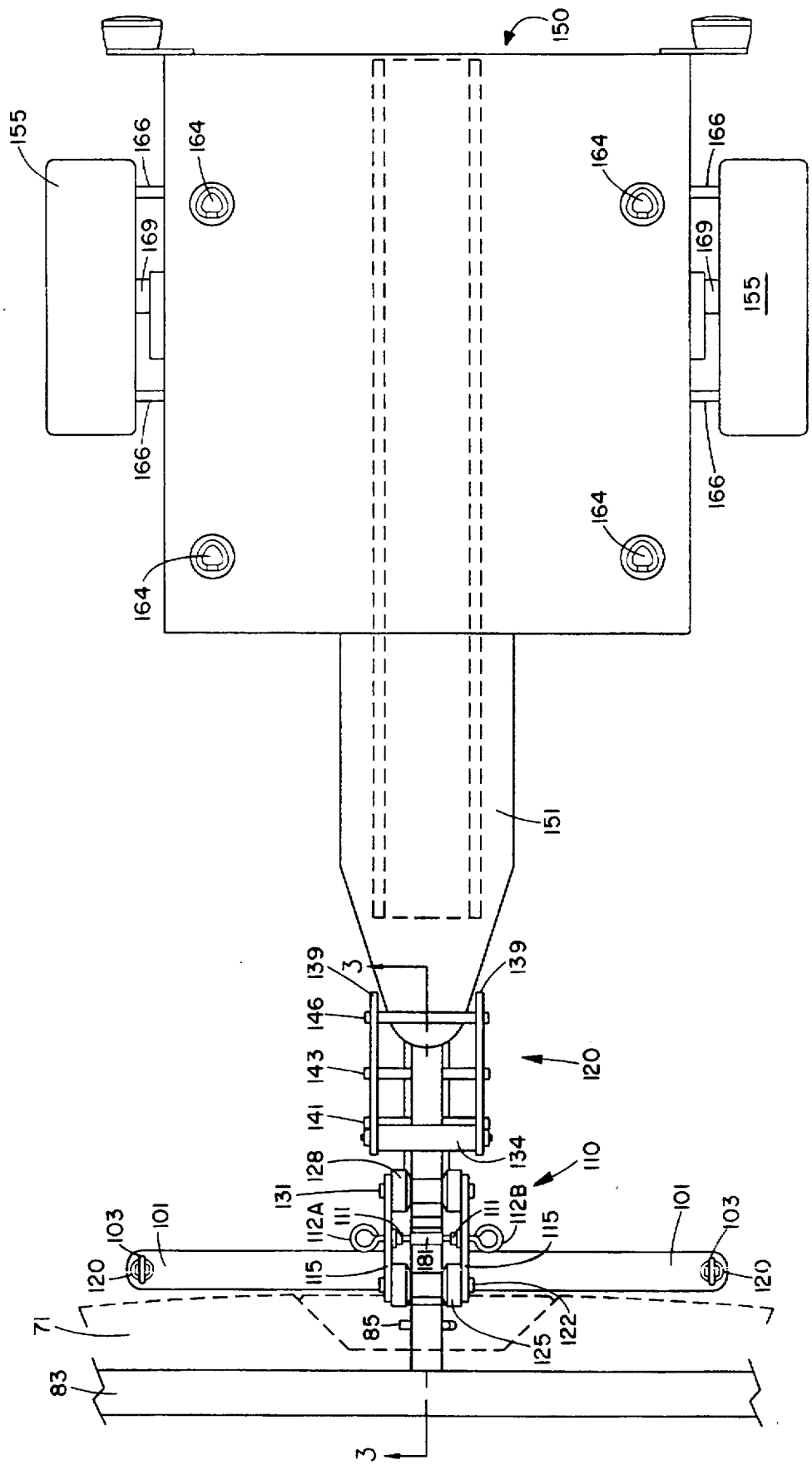
FIG. 2 is a top view of hitch assembly 100 and trailer 150 taken at 2—2 of FIG. 1, showing front cradle member 110, back cradle member 120 and trailer 150.
Figure 3:
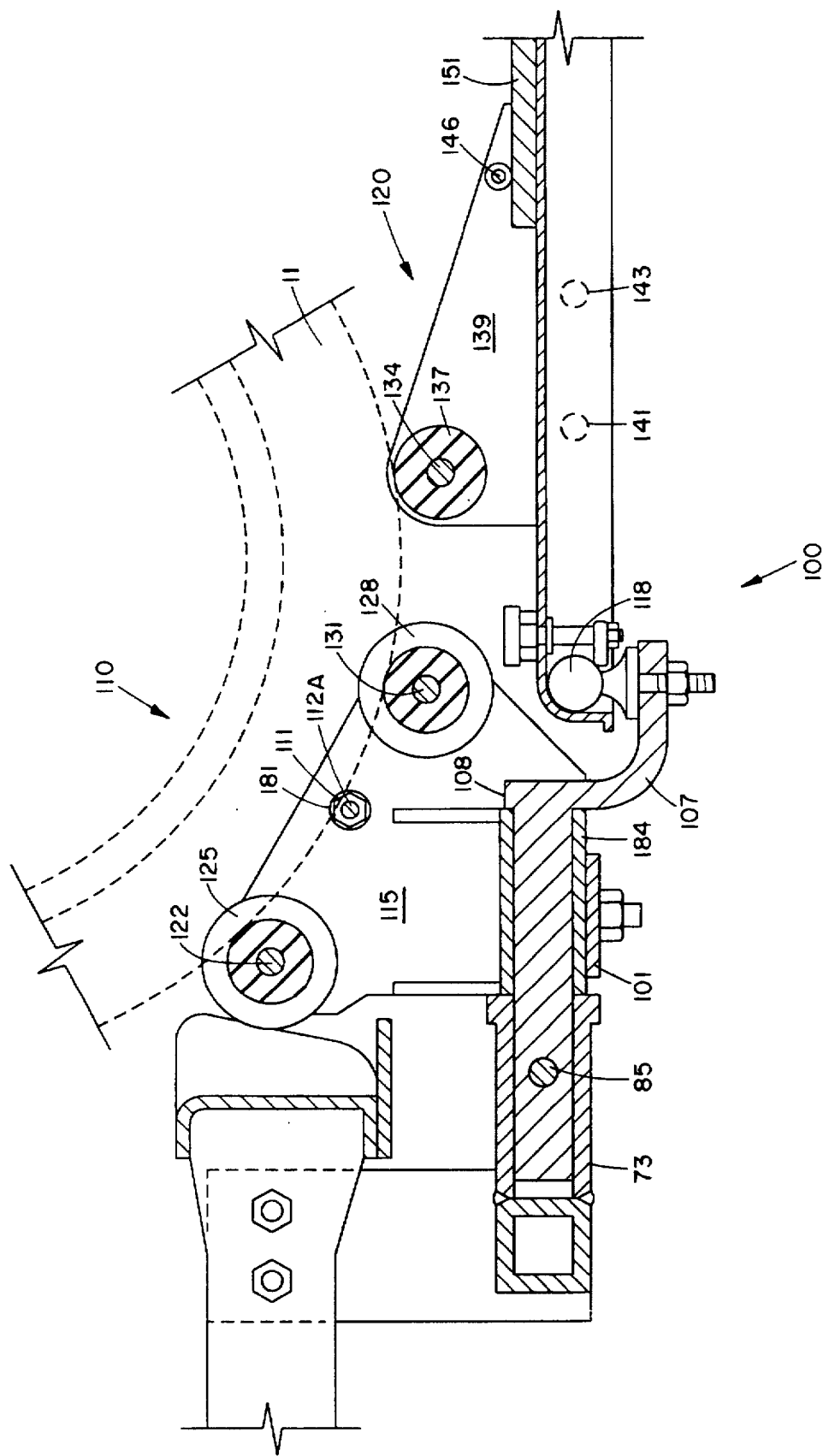
FIG. 3 is a cross-sectional side view of hitch assembly 100, taken at 3—3 of FIG. 2, showing front cradle member 110 and rear cradle member 120, which are positioning wheel 11 over hitch 118.

Additional detail of hitch assembly 100 is shown by referring additionally to FIG. 2, which is a top view of hitch assembly 100 and trailer 150 taken at 2—2 of FIG. 1, and additionally to FIG. 3, which is a cross-sectional side view of hitch assembly 100, taken at 3—3 of FIG. 2.

Front cradle member 110 includes a pair of parallel side walls 115 which are spaced apart by rollers 125 and 128. Lateral support for side walls 115 is provided by retaining pins 122 and 131. Retaining pin 122 extends through roller 125 and side walls 115, and keep side walls 115 affixed to roller 125. Retaining pin 131 extends through roller 128 and side walls 115, and keep side walls 115 affixed to roller 128. Further lateral support for side walls 115 is provided by a pair of eye bolts 112A and 112B, which extend through side walls 115, and are fastened together utilizing fastener 181, and fasteners 111.

Roller 128 and roller 125 further include wheel receiving groove 128A and wheel receiving groove 125A, respectively, for receiving wheel 11. The shape of receiving grooves 128A and 125A will tend to restrict lateral movement of wheel 11 during transportation.

Rear cradle member 120 includes a pair of parallel side walls 139 spaced apart by roller 134, and lateral support 141, lateral support 143 and lateral support 146. Retaining pin 137 extends through roller 134 and side walls 139, and keep side walls 139 affixed to roller 134. In contrast to roller 125 and roller 128, roller 134 is generally smooth to permit lateral movement of wheel 11 during transportation, namely during turning operations.

Roller 125, roller 128, and roller 134 are generally arranged in a orientation suitable to position at least a portion of wheel 11 over and preferably in front of hitch 118. Roller 125, roller 128, and roller 134 are also generally arranged in a orientation suitable to provide stability against forward, backward or lateral movement of motorcycle 10 during transportation. It should be understood that while cradles 110 and 120 have been illustrated as having 2 and 1 rollers respectively, any suitable number of rollers may be utilized.

In the embodiment shown, the hitch assembly 100 includes a cradle member having two components, a front cradle member 110 and a rear cradle member 120. Of course it should be understood that the cradle member can comprise more than two cradle members, or even a single cradle member. The requirement is that the cradle member must function to position at least a portion of wheel 11 over or preferably in front of hitch 118 and that the cradle member provide stability against forward, backward or lateral movement of motorcycle 10 during transportation. In the embodiment shown, wheel 11 is secured in place by tie downs 197 which are connected to eye bolts 112A and 112B. It is generally desired to protect wheel 11 by using a non-abrasive padded member 202 in order to prevent scratches to wheel 11. Of course it is understood that roller 134 can be positioned further behind roller 128 and above roller 128, so that wheel 11 is held between roller 134, roller 128 and roller 125, to provide stability and prevent backward movement of wheel 11. For example, positioned behind wheel 11 in a position symetric to the position of roller 125.

Figure 4:
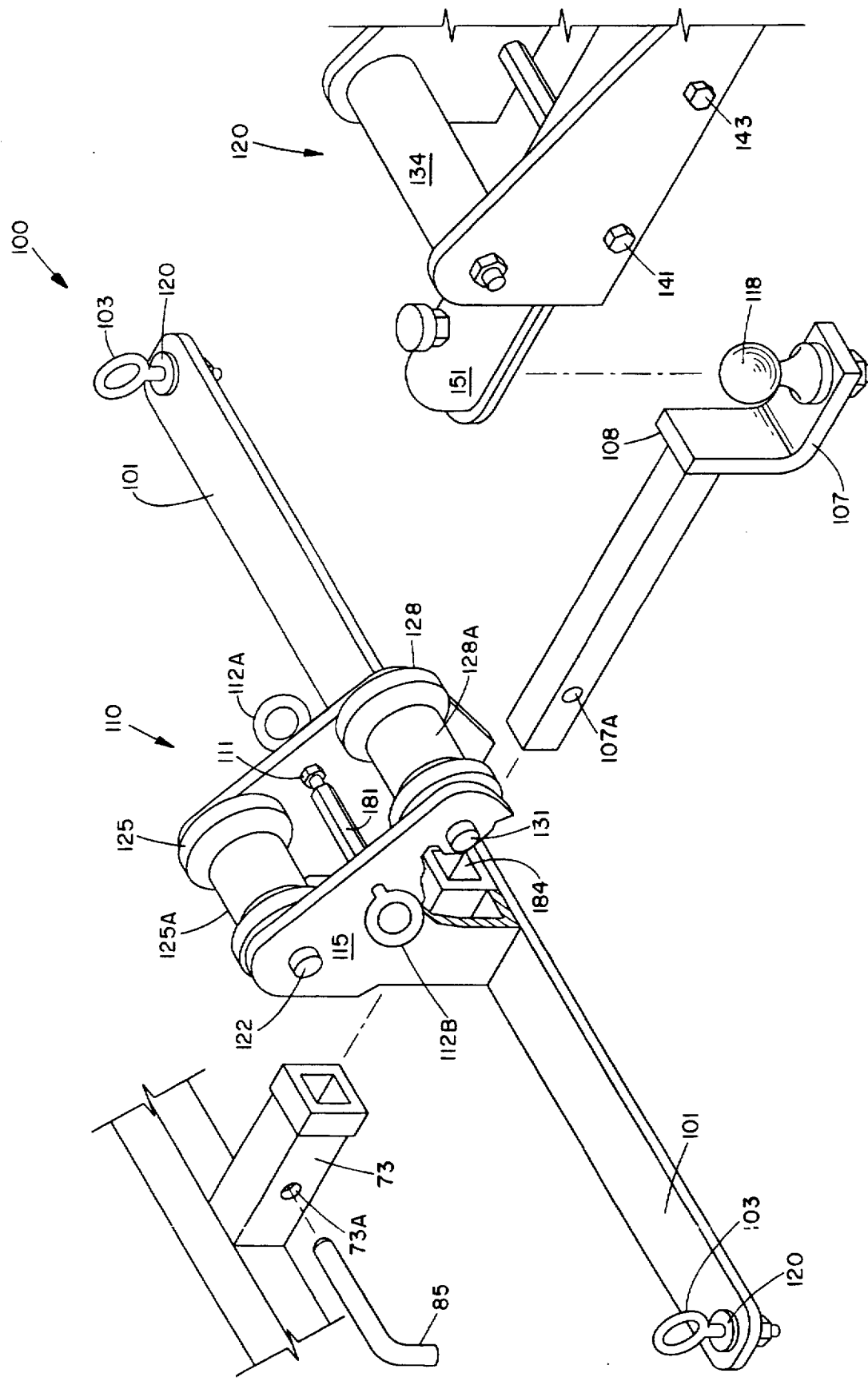
FIG. 4 is an exploded isometric view of hitch assembly 100 of the present invention, showing front cradle member 110, receiving arm 73, and hitch support 107 with hitch 118.

Referring additionally to FIG. 4, which is an exploded isometric view of hitch assembly 100 of the present invention, there is shown front cradle member 110, receiving arm 73, and hitch support 107 with hitch 118.

Front cradle member 110 further includes sleeve 184 which is positioned between parallel walls 115 as shown in FIG. 4. Both sleeve 184 and receiving arm 73 are adapted to receive hitch support 107. Hitch support 107 extends through sleeve 184 and into receiving arm 73. Hitch support 107 and receiving arm 73 include retaining pin slot 107A and retaining pin slot 73A, respectively, both of which slots are adapted to receive retaining pin 85. With hitch support 107 extending through sleeve 184 and into receiving arm 73, retaining pin slots 107A and 73A are aligned to permit retaining pin 85 to be inserted through retaining pin slots 107A and 73A to secure hitch support 107 and front cradle 110 to receiving arm 73, and thus ultimately to vehicle 70. Lip 108 on hitch support 107 prevents hitch support 107 from being inserted entirely into sleeve 184, and of course prevents sleeve 184 from sliding completely over hitch support 107.

One or more stabilizer bars 101 extend laterally from front cradle member 110. Positioned on the end of each stabilizer bar 101 is an eye bolt 103 secured to stabilizer bar 101 by fastener 126. In the embodiment shown, the stabilizer bars on each side of front cradle member 110 are actually one continuous bar, however, it is understood that two or more stabilizer bars can be utilized.

Referring still to FIG. 2, trailer 150 further includes tie downs 164 positioned on trailer bed 159, wheel axles 169, trailer lights 157 and fender supports 166.

Operation of the present invention is as follows. Motorcycle 10 is positioned on trailer 150 behind vehicle 70, such that at least a portion of wheel 11 is positioned over or in front of hitch 118. Once motorcycle 10 is in the desired positioned, it is secured in place utilizing straps, ropes, chain or other tie down means. Any suitable combination of tie down means extending from the body of motorcycle 10 to the various tie downs 164 and/or eye bolts 103 are utilized to secure motorcycle 10. In the embodiment shown, tie down 191 is threaded through eye bolts 103 and further, tie down 193 and 195 are attached to tie downs 164, all in order to hold the motorcycle in position. Additionally, wheel 11 is secured to front cradle member 110 utilizing tie down 197 positioned around wheel 11 and through eye bolt 112A and eye bolt 112B.

Preferably, wheel 11 and/or handlebars 21 are secured in a manner sufficient to prevent wheel 11 from moving out-of-plane with vehicle 70 during a turning operation. Without being limited by theory, applicant believes that immobilizing wheel 11 in such a fashion will increase the stability of the motorcycle 10 during the execution of a turn. Of course, it is still necessary to utilize tie downs, however, applicant believes that less a extensive tie down arrangement may be utilized.

Thus, during the execution of a turn, front wheel 11 is positioned in wheel receiving grooves 125A and 128A and will remain oriented in-plane with the vehicle during the turn. As trailer 150 moves relative to vehicle 70 during the execution of the turn, roller 134 and wheel 11 slide relative to each other, thus allowing for wheel 11 to remain in-plane with vehicle 70.

Figure 5:
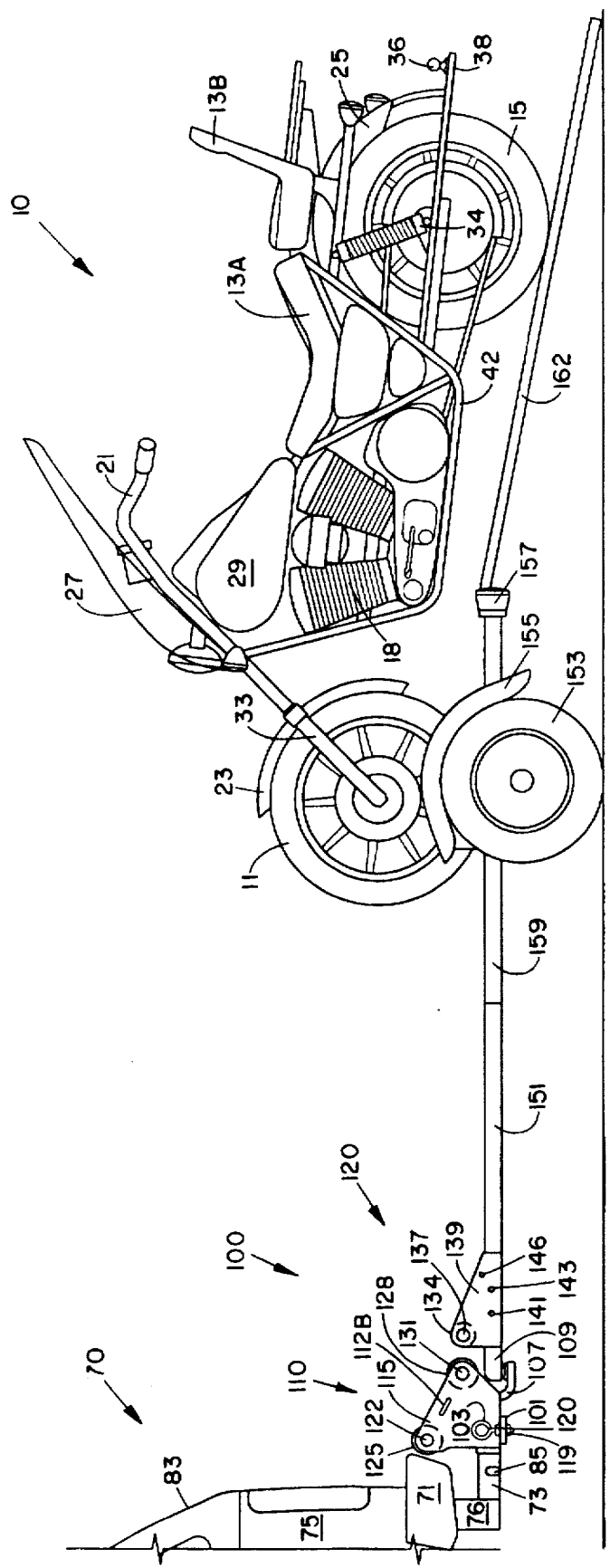
FIG. 5 is an illustration showing motorcycle 10 being unloaded from trailer 150 via ramp 162.

Referring now to FIG. 5 there is shown motorcycle 10 being unloaded from trailer 150 via ramp 162. Reference numbers refer to various members as described above. In such an unloading operation, tie downs 193 and 195 which are secured to tie downs 164 and eye bolts 103, are first unfastened, wheel 11 is released from eye bolts 112A and 112B, and then ramp 162 is positioned to allow motorcycle 10 to be unloaded from trailer 150.

Figure 6:
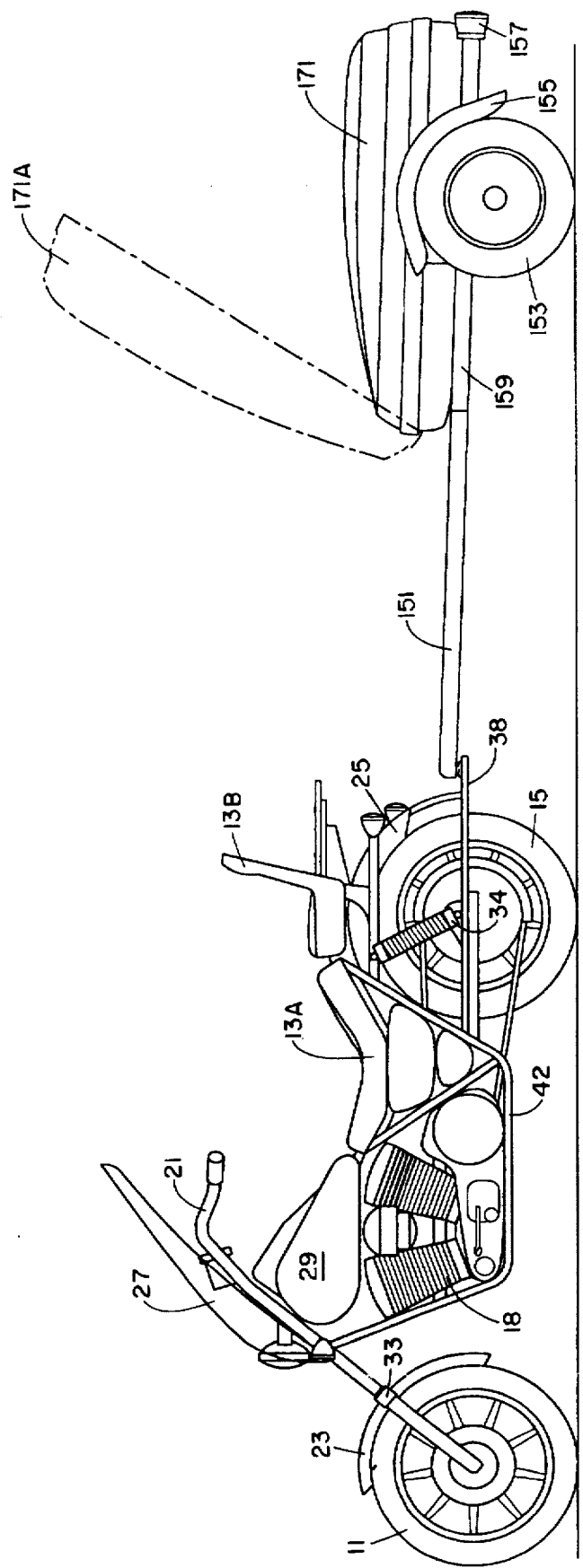
FIG. 6 is an illustration showing motorcycle 10 now towing trailer 150 with cargo container 171.

Referring now to FIG. 6, which is an illustration showing motorcycle 10 now towing trailer 150 with cargo container 171. Reference numbers refer to various members as described above. Upon arrival at the destination, trailer 150 may be towed behind motorcycle 10. Trailer 150 is unfastened from hitch 118 and then subsequently fastened to motorcycle hitch 36. If desired, cargo container 171 may be released from fasteners 173 on top of vehicle 70, and then secured to trailer 150 utilizing fasteners 164. Cargo container may have a lid which pivots into open position 171A as shown.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. An apparatus for use in hauling a wheeled vehicle having a wheel behind a towing vehicle having a hitch, the apparatus comprising:
    (a) a trailer comprising:
        (i) a bed;
        (ii) wheels affixed to the bed;
        (iii) a tongue affixed to the bed, wherein the tongue is adapted to lockably engage the hitch; and
        (iv) a first wheel cradle supported by the bed, and adapted to receive the wheel of the wheeled vehicle; and
    (b) a second wheel cradle adapted to be supported by the hitch and adapted to cooperatively support with the first wheel cradle the wheel of the wheeled vehicle once the tongue is lockably engaged with the hitch of the towing vehicle.

2. The apparatus of claim 1 wherein said tongue is adapted to lockably engage a ball hitch.

3. The apparatus of claim 1 wherein the first wheel cradle comprises a first set of parallel side members spaced apart by a first lateral support member, and wherein the second wheel cradle comprises a second set of parallel side members spaced apart by a second lateral support member.

4. The apparatus of claim 1 wherein said trailer is further adapted to be towed behind a motorcycle.

5. The apparatus of claim 1 wherein the wheel cradle comprises a set of parallel side members spaced apart by a smoothed surface cylindral lateral support member adapted to receive the wheel of the wheeled vehicle between the side members onto the lateral support, wherein the cradle is adapted to position at least 35 percent of the wheeled vehicle weight on the hitch of the towing vehicle when the tongue is lockably engaged with the hitch of the towing vehicle, and wherein tongue is adapted to lockably engage a ball hitch.

6. An apparatus for use in hauling a wheeled vehicle having a wheel on a trailer having a tongue behind a towing vehicle, the apparatus comprising:
    (a) a hitch adapted to be affixed to said towing vehicle, and adapted to receive said tongue;
    (b) a wheel cradle adapted to be supported by said towing vehicle and adapted to receive said wheel of said wheeled vehicle, with the cradle further adapted to position at least a portion of the wheel of wheeled vehicle between the hitch and the towing vehicle,
    wherein the wheel cradle comprises a set of parallel side members spaced apart by a lateral support member adapted to receive the wheel of the wheeled vehicle between the side members onto the lateral support; and
    wherein the lateral support member comprises a cylindrically shaped roller for receiving the wheel of the wheeled vehicle.

7. A trailer hitch assembly for use in hauling a wheeled vehicle having a wheel on a trailer having a tongue behind a towing vehicle, the hitch assembly comprising:
    (a) a hitch adapted to be affixed to said towing vehicle, and adapted to receive said tongue of the trailer;
    (b) a wheel cradle adapted to be supported by the towing vehicle and adapted to receive said wheel of the wheeled vehicle, with the cradle further adapted to position at least a portion of the wheel of wheeled vehicle between the hitch and the towing vehicle,
    wherein the wheel cradle comprises a set of parallel side members spaced apart by two rollers to receive the wheel of the wheeled vehicle between the side members onto the two rollers.

8. A trailer hitch assembly for use in hauling a wheeled vehicle having a wheel on a trailer having a tongue behind a towing vehicle, the hitch assembly comprising:
    (a) a hitch adapted to be affixed to said towing vehicle, and adapted to receive said tongue of the trailer:
    (b) a first wheel cradle adapted to be supported by the trailer;
    (c) a second wheel cradle adapted to be supported by the towing vehicle and adapted to receive a wheel of the wheeled vehicle, with the second cradle further adapted to position at least a portion of the wheel of the wheeled vehicle between the hitch and the towing vehicle and;
    (d) wherein said first wheel cradle is further adapted to cooperatively support the wheel of the wheeled vehicle with the second wheel cradle.

9. A trailer hitch assembly for use in hauling a wheeled vehicle having a wheel on a trailer having a tongue behind a towing vehicle, the hitch assembly comprising:

(a) a hitch adapted to be affixed to said towing vehicle, and adapted to receive the tongue of the trailer;

(b) a wheel cradle adapted to be supported by the vehicle and adapted to receive the wheel of the wheeled vehicle, with the cradle further adapted to position at least a portion of the wheel of wheeled vehicle between the hitch and the towing vehicle, wherein the wheel cradle comprises a set of parallel side members spaced apart by two rollers to receive the wheel of the wheeled vehicle between the side members onto the two rollers, and wherein the hitch is a ball hitch.

* * * * *